United States Patent Office 2,814,169
Patented Nov. 26, 1957

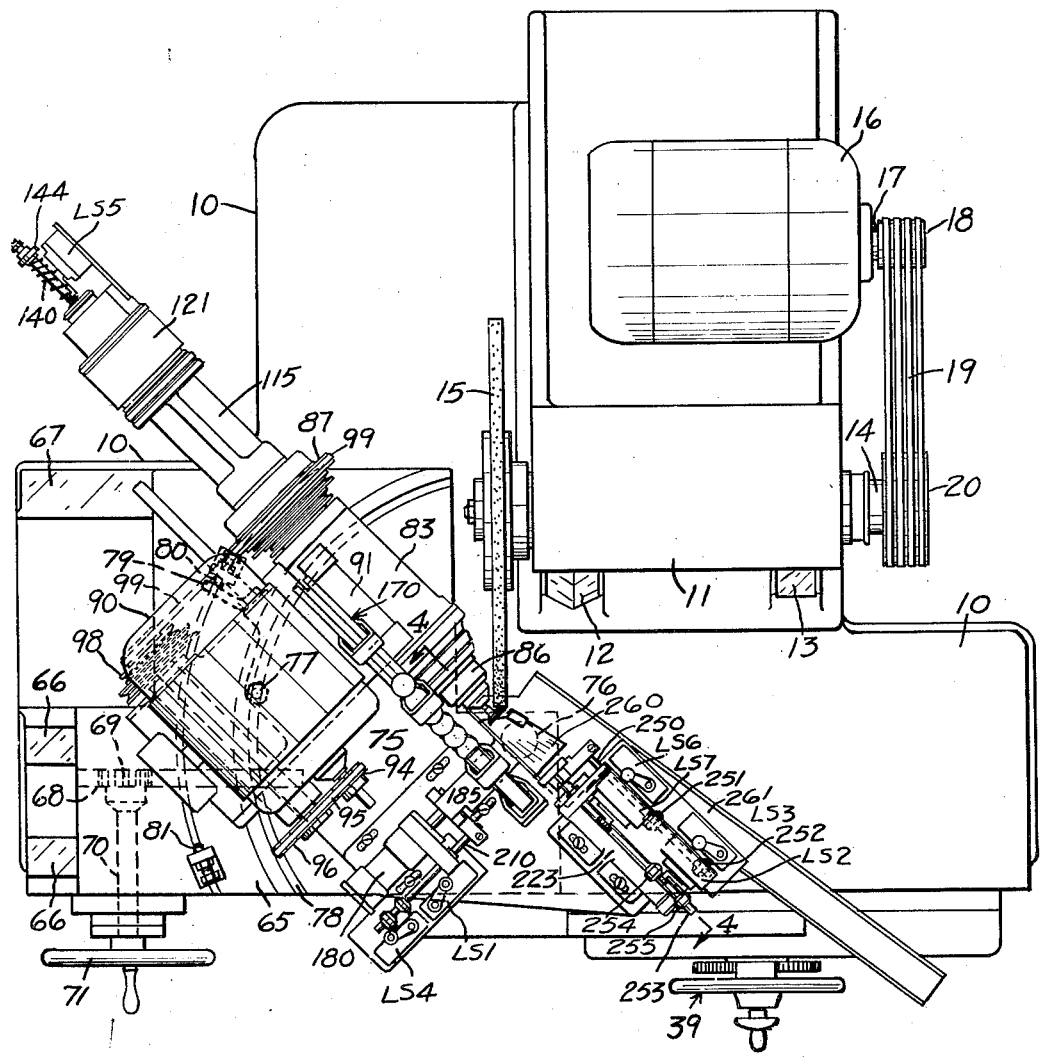

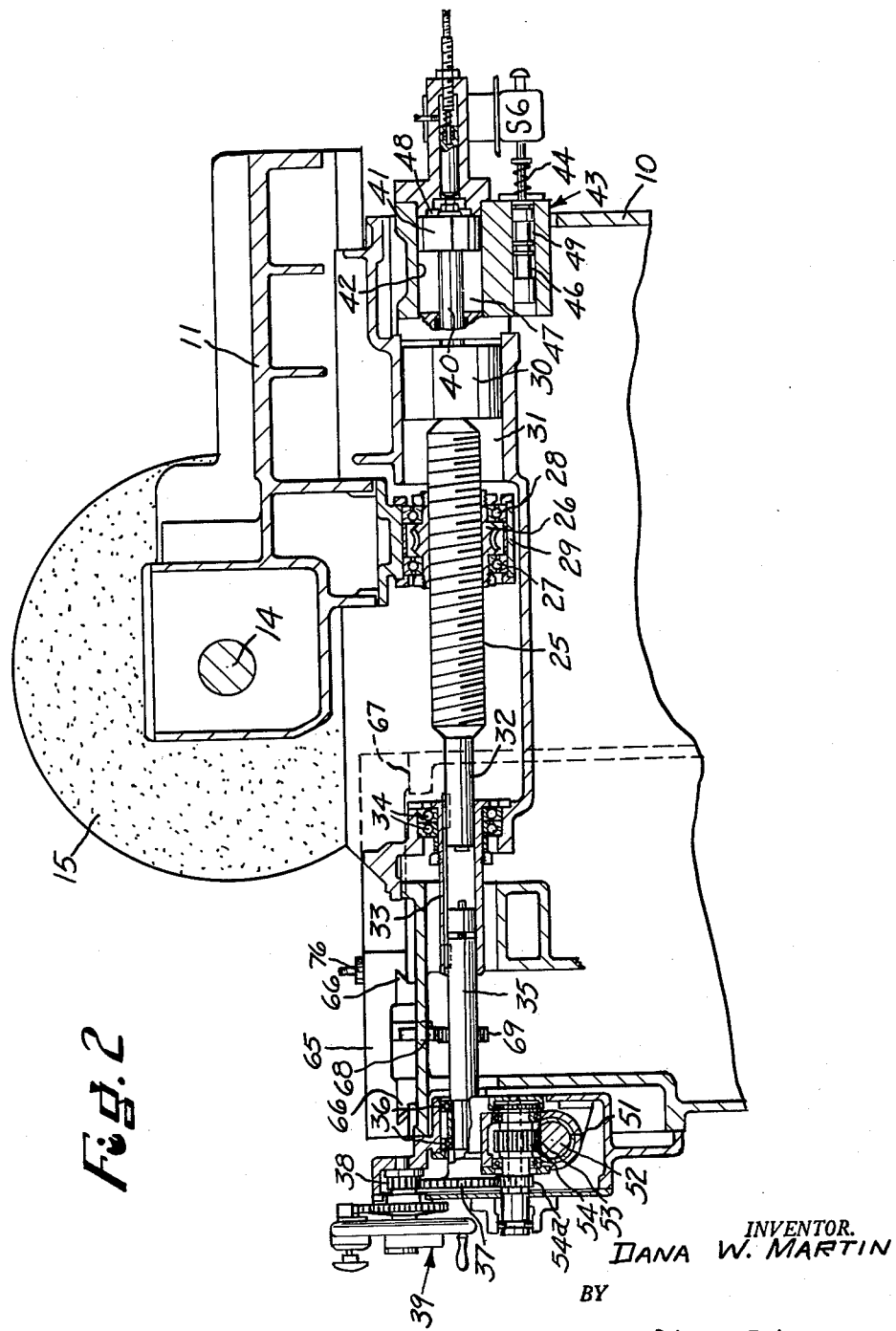

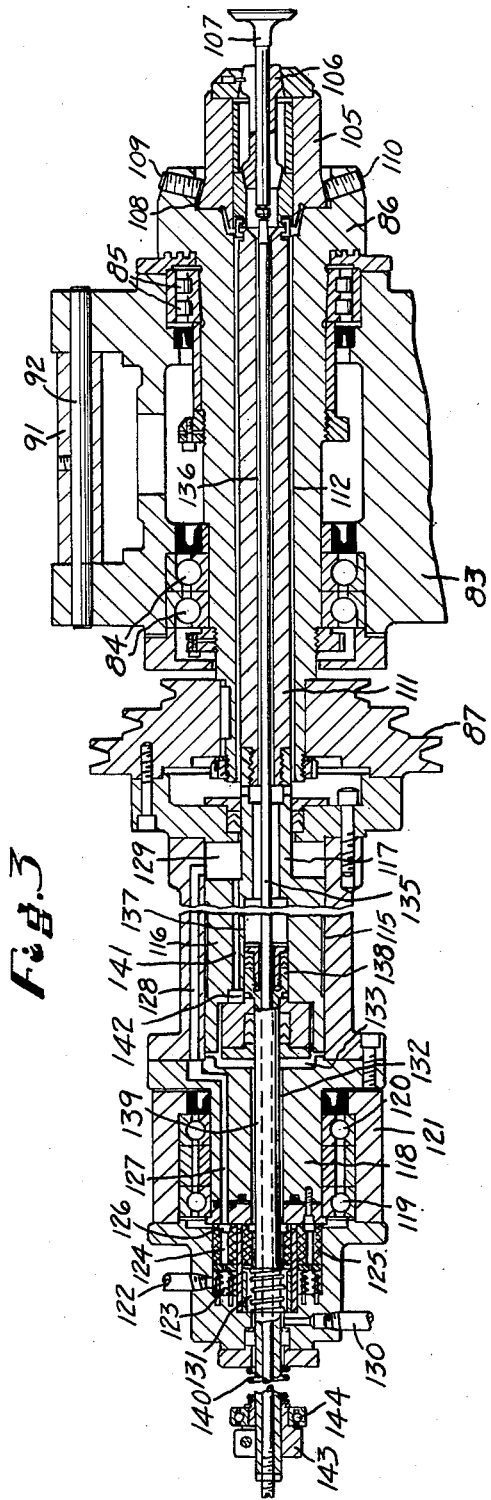

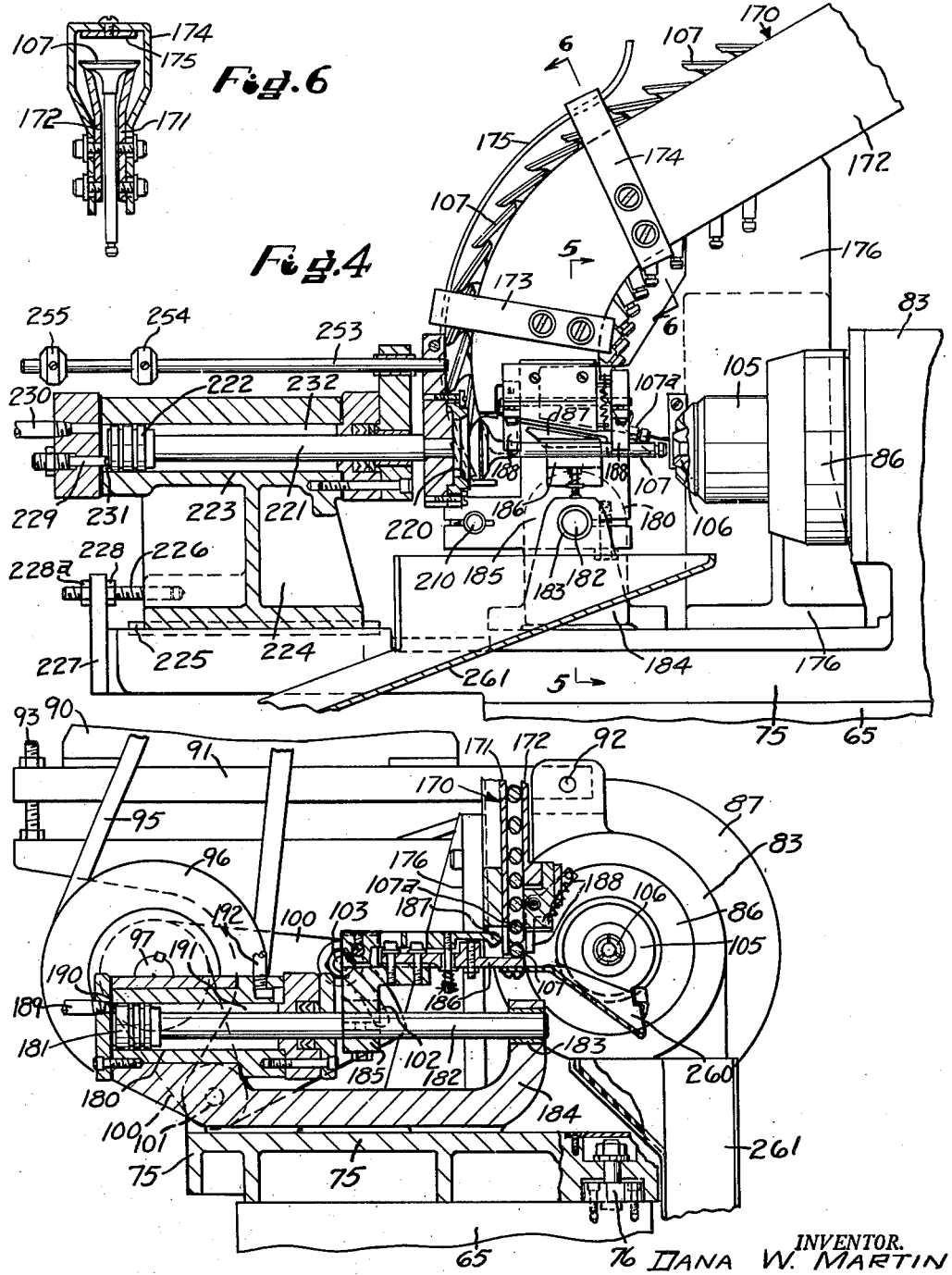

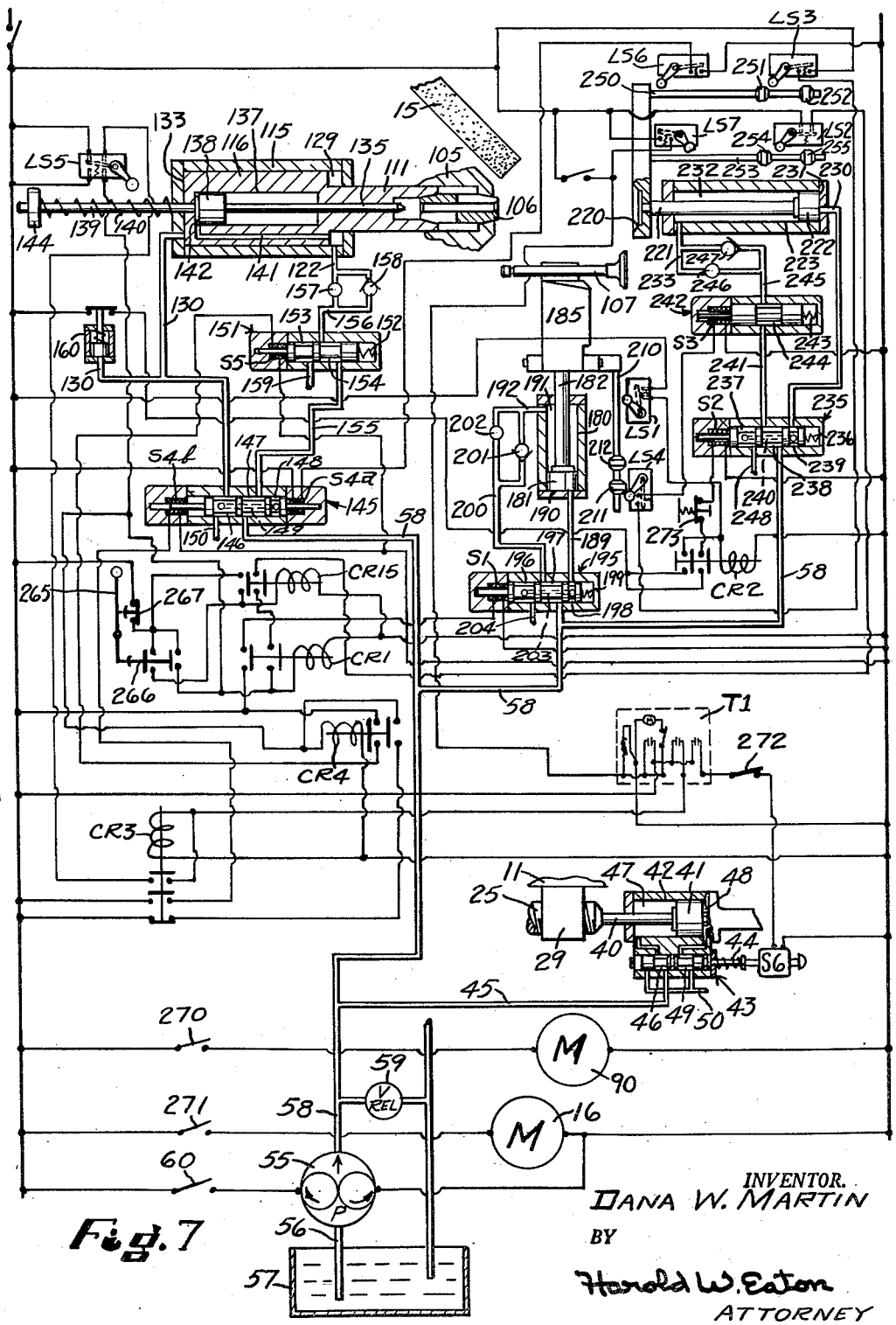

2,814,169

VALVE GRINDING MACHINE

Dana W. Martin, Northboro, Mass., assignor to Norton Company, Worcester, Mass., a corporation of Massachusetts Application December 27, 1954, Serial No. 477,772

7 Claims. (Cl. 51—105)

The invention relates to grinding machines, and particularly to an automatically operated machine for grinding work pieces such as the frusto-conical faces of automotive engine valves and the like.

One object of the invention is to provide a simple and thoroughly practical automatically operated grinding machine for successively grinding a plurality of valves to the desired and predetermined extent. Another object of the invention is to provide an automatic valve grinding machine in which successive valves to be ground are automatically loaded into and discharged from a work supporting collet. Another object is to provide a work loading mechanism comprising a transversely movable work head to convey work pieces into axial alignment with a work supporting collet and to provide a pusher automatically to push successive valves into operative position relative to the work collet. Another object is to provide an automatic ejecting mechanism for ejecting work pieces from said collet after a grinding operation.

Another object is to provide a hydraulically operated loader head and a hydraulically operated pusher mechanism which are interlocked so that the movement of the loader head into an operative position initiates movement of said pusher mechanism. Another object of the invention is to provide a hydraulically operated collet actuating mechanism which is initiated by and in timed relation with movement of the pusher mechanism to clamp successive work pieces in the collet after they have been positioned therein. Other objects will be in part obvious or in part pointed hereinafter.

In the accompanying drawings, in which is shown one of various possible embodiments of the mechanical features of this invention:

Fig. 1 is a plan view of the valve grinding machine;

Fig. 2 is a vertical sectional view, on an enlarged scale, through the grinding machine showing the wheel feeding mechanism;

Fig. 3 is a vertical sectional view, on an enlarged scale, through the work supporting spindle;

Fig. 4 is a vertical sectional view, on an enlarged scale, taken approximately on the line 4—4 of Fig. 1 through the valve loading mechanism;

Fig. 5 is a fragmentary sectional view taken approximately on the line 5—5 of Fig. 4 through a portion of the valve loading mechanism;

Fig. 6 is a cross sectional view taken approximately on the line 6—6 of Fig. 4; and Fig. 7 is a combined hydraulic and electric diagram of the actuating mechanisms and the controls therefor.

A valve machine has been illustrated in the drawings comprising a base 10 which supports a transversely movable wheel slide 11 on a V-way 12 and a flat way 13 (Fig. 1) formed on the upper surface of the base 10. The wheel slide 11 is provided with a rotatable wheel spindle 14 journalled in bearings (not shown) mounted within the wheel slide 11. A grinding wheel 15 is mounted on the left hand end of the spindle 14 (Fig. 1).

A driving mechanism is provided for the wheel spindle 14 and grinding wheel 15 comprising an electric motor 16 mounted on the upper surface of the wheel slide 11. The motor 16 is provided with a motor shaft 17 having a multiple V-grooved pulley 18 supported on the right hand end thereof (Fig. 1). The pulley 18 is connected by multiple V-belts 19 with a multiple V-grooved pulley 20 mounted on the right hand end of the wheel spindle 14.

A wheel feeding mechanism is provided for imparting a transverse feeding movement to the wheel slide 11 comprising a rotatable feed screw 25 which meshes with a rotatable feed nut 26. The feed nut 26 is journalled in a pair of spaced anti-friction bearings 27 and 28 which are in turn supported by a bracket 29 depending from the underside of the wheel slide 11.

The right hand end of the feed screw 25 is rotatably journalled in a slidably mounted sleeve 30 which is slidably supported within a cylindrical aperture 31 supported in fixed relationship with the base 10. The feed screw 25 is provided with a forwardly extending cylindrical portion 32 which is slidably keyed within a rotatable sleeve 33. The right hand end of the sleeve 33 is journalled in anti-friction bearings 34 which are supported in fixed relationship with the base 10.

A rotatable shaft 35 is slidably keyed within the left hand end of the sleeve 33. The left hand end of the shaft 35 is journalled in anti-friction bearings 36 supported in fixed relationship with the base 10. A gear 37 is mounted on the left hand end of the shaft 35 and meshes with a gear 38 which is operatively connected to rotate with a manually operable feed wheel 39.

A hydraulically operated mechanism is provided to impart a rapid approaching and receding movement to the grinding wheel slide 11. This mechanism may comprise a piston and cylinder mechanism arranged in axial alignment with the feed screw 25. A piston rod 40 is fastened to the sleeve 30. A piston 41 is mounted on the right hand end of the piston rod 40. The piston 41 is slidably mounted within a cylinder 42.

A control valve 43 is provided for controlling the admission to and exhaust of fluid from the cylinder 42. The valve 43 is a piston type valve which is normally held in its right hand end position by means of a spring 44. A solenoid S6 is provided which when energized serves to shift the valve 43 into its left hand end position. In the position of the valve 43 (Fig. 7), when fluid under pressure is passed through a pressure pipe 45 it enters a valve chamber 46 and in the position of the parts as shown in Fig. 2 passes into a cylinder chamber 47 to cause the piston 41 together with the wheel slide 11 and grinding wheel 15 to move toward the right (Fig. 2) into an inoperative position. During this movement, fluid within a cylinder chamber 48 exhausts through a valve chamber 49 and out through an exhaust pipe 50. When the solenoid S6 is energized, fluid under pressure is admitted to the cylinder chamber 48 to cause a rapid movement of the piston 41 together with the wheel slide 11 to position the grinding wheel 15 in operative relation with the valve to be ground.

The grinding feed may be obtained by means of a cylinder 51 (Fig. 2) containing a slidably mounted piston 52 which is provided with rack teeth 53 meshing with a gear 54. A gear 54a is fixedly mounted to rotate with the gear 54 and meshes with the gear 37 to impart a rotary motion to the feed screw 25 so as to impart a grinding feed to the grinding wheel 15. This feeding mechanism is identical with that disclosed in the prior U. S. Patent No. 2,572,529 to Herbert A. Silven, dated October 23, 1951, to which reference may be had for details of disclosure not contained herein.

A fluid pressure system is provided for supplying fluid under pressure to the various mechanisms of the machine. This system may comprise a motor driven fluid pump 55 which draws fluid through a pipe 56 from a fluid reservoir 57 and passes fluid under pressure through a pipe 58. A relief valve 59 is connected to the pressure pipe 58 by means of which excess fluid under pressure may be returned directly to the reservoir 57 so as to maintain a substantially uniform pressure within the fluid system. A manually operable switch 60 is provided to facilitate starting and stopping the fluid pump 55.

The base 10 also serves as a support for a longitudinally adjustable work table 65 which is arranged to slide longitudinally on a dove-tailed slideway 66 and a flat way 67 formed on the upper surface of the base 10. A manually operable traverse mechanism is provided to facilitate positioning the table 65 relative to the base 10. This mechanism may comprise a rack bar 68 depending from the underside of the table 65 which meshes with a gear 69 mounted on the inner end of a rotatable shaft 70. A manually operable hand wheel 71 is mounted on the outer end of the shaft 70. It will be readily apparent from the foregoing disclosure that a manual rotation of the hand wheel 71 will be imparted to transmit the longitudinal movement to the work table 65.

A platen 75 is pivotally supported by a pivot stud 76 on the upper surface of the work table 65. The platen 75 is arranged to be swung in a horizontal plane to position the work axis angularly relative to the wheel face as will be hereinafter described. A clamping bolt 77 passes through a hole in the platen 75 and its head rides in an arcuate T-slot 78 formed in the upper surface of the work table 65. In order to facilitate angularly locating the platen 75, a projecting lug 79 is provided on the platen 75 which is arranged to be swung into either engagement with an adjustable screw 80 or a stop screw 81 carried on the work table 65. The stop screws 80 and 81 serve to facilitate a precise angular adjustment of the platen 75.

The platen 75 is provided with an upwardly extending housing 83 which carries a pair of spaced anti-friction bearings 84 and 85 (Fig. 3) rotatably to support a work spindle 86. The spindle 86 is provided with a multiple stepped V-grooved pulley 87 by means of which the spindle 86 may be rotated at the desired speed.

A driving mechanism is provided for the work spindle 86 comprising a motor 90 which is supported on a pivotally mounted motor platen 91 (Fig. 5), one end of which is pivotally supported on a rock shaft 92 carried by the housing 83. An adjusting screw 93 is connected between the platen 91 and the housing 83 to facilitate adjusting the position of the platen 91 so as to tension the driving belt as will be hereinafter described. The motor 90 is provided with a V-grooved pulley 94 which is connected by a V-belt 95 with a pulley 96 mounted on one end of a shaft 97. The other end of the shaft 97 is provided with a multiple stepped V-grooved pulley 98 which is connected by a V-belt 99 with the pulley 87 on the work spindle 86. In order to facilitate tensioning the V-belt 99, the shaft 97 is preferably rotatably supported on a rock arm 100 which is pivotally supported by a stud 101 on the platen 75. The rock arm 100 is provided with an arcuate slot 102. A clamping screw 103 passes through the arcuate slot 102 and is fixedly mounted on the housing 83. It will be readily apparent that by swinging the rock arm 100, the driving belt 99 may be tensioned as desired after which the rock arm may be clamped in adjusted position by tightening the clamping screw 103. Similarly the V-belt 95 may be tensioned by adjusting the screw 93 to rock the motor platen 91 to obtain the desired driving tension on the belt 95.

The work spindle 86 supports a nose piece 105 which carries a work receiving collet 106 which supports a valve 107 to be ground. The nose piece 105 fits within a recess 108 formed in the right hand end of the spindle 86 and is clamped in position therein by a plurality of clamping screws 109 and 110.

A collet actuating sleeve 111 passes through a central aperture 112 within the spindle 86. The sleeve 111 is connected at its right hand end to cause an endwise movement of the collet 106 to clamp the work piece in position during a grinding operation. The work receiving collet 106 together with the nose piece 105 are standard commercial parts and it is, therefore, not believed necessary to further explain the details of construction thereof.

A piston and cylinder mechanism is provided for actuating the sleeve 111 comprising a cylinder 115 which is fixedly mounted to rotate with the pulley 87. The cylinder 115 contains a slidably mounted piston 116 which is provided at its right hand end with an integral piston rod 117 which is operatively connected to the sleeve 111.

A member 118 is fastened to the left hand end of the cylinder 115 and rotates therewith. The member 118 serves as a support for a pair of spaced anti-friction bearings 119 and 120 which supports a stationary housing 121 to facilitate conveying fluid under pressure to the cylinder 115. When fluid under pressure is passed through a pipe 122 (Fig. 3) it enters a chamber 123 and passes through a cylindrical aperture 124 formed in a sealed ring 125. The aperture 124 is provided with a circular groove 126 which is at all times connected with the left hand end of a passage 127 to convey fluid under pressure through a passage 128 into a cylinder chamber 129 to move the piston 116 toward the left into an inoperative position so as to maintain the collet 106 in an unclamped condition.

When fluid under pressure is passed through a pipe 130 it enters a chamber 131 which connects with a clearance hole 132 formed in the member 118 to pass fluid under pressure into a cylinder chamber 133 to move the piston 116 toward the right (Fig. 3) to move the collet actuating sleeve 111 toward the right to actuate the collet 106 so as to clamp a valve 107 to be ground in operative position therein.

In order to facilitate ejecting valves 107 from the collet 106, an ejector rod 135 is provided which passes through a central aperture 136 formed in the collet actuating sleeve 111. A cylinder 137 is provided within the piston 116 and contains a slidably mounted piston 138 which is operatively connected to the ejector rod 135. The piston 138 is fixedly mounted on the right hand end of a piston rod 139. A compression spring 140 serves normally to hold the ejector rod 135 in a left hand end position.

When fluid under pressure is passed into the cylinder chamber 129 to unclamp the collet 106, fluid also passes from the cylinder chamber 129 through a passage 141 in the piston 116 into a cylinder chamber 142 to move the piston 138 toward the right thereby moving the ejector rod 135 toward the right to eject the valve 107 from the collet 106. The passage 141 in the piston 116 is of relatively small diameter so that fluid under pressure entering the cylinder chamber 129 first acts upon the piston 116 to move it toward the left to unclamp the collet before pressure builds up within the cylinder chamber 142 to move the ejector rod 135 to eject the valve 107 which has been ground.

An adjustably mounted collar 143 is mounted on the left hand end of the piston rod 139. The collar 143 supports a ball bearing 144, the outer ring of which is arranged in the path of the actuating roller of a limit switch LS5. The piston rod 139 rotates during operation of the work head and the ball bearing 144 is provided so that when the outer ring moves into actuating engagement with the actuating roller of the limit switch LS5, the outer ring will be held stationary by frictional engagement therewith so as to prevent excessive wear of the parts. The collar 143 may be adjusted longitudinally relative to the piston rod so as to facilitate actuating the limit switch LS5 when desired.

A fluid pressure control mechanism is provided for controlling the admission to and exhaust of fluid from the cylinders 115 and 137 comprising a solenoid actuated control valve 145 which is arranged to be moved toward the left when a solenoid S4a is energized, and moved toward the right when a solenoid S4b is energized. The control valve 145 is a piston type valve having a slidably mounted valve member formed with a plurality of integral pistons spaced from each other to form a plurality of valve chambers 146, 147 and 148. The slidably mounted valve member is provided with a central passage 149. An exhaust pipe 150 is provided for exhausting fluid from the valve 145 into the reservoir.

A solenoid actuated control valve 151 is provided between the valve 145 and the cylinder 115. The valve 151 is normally held in a left hand end position by means of a spring 152. A solenoid S5 is arranged when energized to shift the valve 151 into a right hand end position. The valve 151 is a piston type valve having a slidably mounted valve member formed with a plurality of spaced valve pistons forming a pair of valve chambers 153 and 154. In the position of the valves 145 and 151 (Fig. 7) fluid under pressure from the pressure pipe 58 enters the valve chamber 147 and passes through a pipe 155 to the control valve 151 entering the valve chamber 154 and passing out through a pipe 156, through a throttle valve 157 and through the pipe 122 into the cylinder chamber 129 to move the piston 116 toward the left to unclamp the work collet 106.

A ball check valve 158 is provided to by-pass fluid around the throttle valve 157 during a clamping actuation of the work collet 106.

When the solenoid S5 is energized, the valve 151 is shifted to a right hand end position so that fluid within the cylinder chamber 129 may exhaust through the pipe 122, through both the ball check valve 158 and throttle valve 157, through the pipe 156 into the valve chamber 153 and out through an exhaust pipe 159 into the reservoir 57.

When fluid under pressure is admitted to the cylinder chamber 129 to cause an unclamping of the collet 106, fluid may also pass through the passage 141 into the cylinder chamber 142 to move the piston 138 toward the right so that the ejector rod 135 will eject a work piece 107 from the collet 106.

When the solenoid S4a is energized, as will be hereinafter described, the valve 145 shifts to an extreme left hand end position so that fluid under pressure from the pipe 58 entering the valve chamber 147 passes through the pipe 130 into the cylinder chamber 133 to move the piston 116 toward the right to actuate the work collet 106 to clamp a valve 107 therein. At the same time fluid under pressure passing through the pipe 130 actuates a pressure switch 160 as will be hereinafter described.

A work loading chute 170 is supported by a bracket 176 on the platen 75. The chute 170 comprises a pair of spaced side plates 171 and 172 (Fig. 6) which are spaced apart so that the valves 107 may slide therebetween.

The side plate 171 is fixedly supported on the bracket 176. A plurality of substantially U-shaped brackets 173 and 174 are provided to support the side plates 171 and 172 in the desired relationship with each other. The brackets 173 and 174 also serve as supports for a guide band 175 which serves to prevent valves 107 from moving upwardly out of engagement with the side plates 171 and 172.

The chute 170 serves to convey successive work pieces to be ground to a hydraulically operated work loading mechanism comprising a cylinder 180 which contains a slidably mounted piston 181. The cylinder 180 is supported on the platen 75. The piston 181 is connected to the left hand end of a piston rod 182. The other end of the piston rod 182 is slidably journalled in a bearing 183 supported in an upwardly projecting bracket 184. A work loading head 185 is adjustably clamped onto the piston rod 182 and is provided with a pair of work engaging fingers for engaging the stem of a valve to be ground. The loader head 185 supports a lower work loading finger 186 having a right angle surface thereon for supporting the stem of a valve to be ground. The head 185 is also provided with a spring pressed work engaging finger 187 having an arrow-pointed right hand end which is arranged to slide into engagement with the valve stem when the head 185 is moved toward the right (Fig. 5). The upper face of the forward end of the finger 187 is angularly arranged so as to engage the second valve stem 107a to prevent it dropping onto the finger 186 during a loading operation. The side plate 172 is provided with spring pressed detents 188 which is arranged yieldably to maintain the lower valve stem 107 in the position illustrated in Fig. 5 until the head 185 moves forward, that is, toward the right (Fig. 5). When fluid under pressure is passed through a pipe 189 into a cylinder chamber 190 (Fig. 5) the piston 181 together with the piston rod 182 and the loader head 185 move toward the right so that the spring pressed finger 187 moves over the valve stem so as to hold the lower valve stem in the chute 170 as the loader head 185 moves toward an operative position. The piston 181 together with the loader head 185 move toward the right (Fig. 5) to carry the bottom valve stem in the chute 170 into axial alignment with the work supporting collet 106. The work loader head 185 is adjusted longitudinally on the piston rod 182 so that when the piston 182 engages the right hand end of the cylinder 180, the work piece being loaded will be positioned in axial alignment with the work receiving collet 106. During this movement of the piston, fluid within a cylinder chamber 191 may exhaust through a pipe 192.

A solenoid actuated control valve 195 is provided for controlling the admission to and exhaust of fluid from the cylinder 180. The valve 195 is a piston type valve having a plurality of valve chambers 196, 197 and 198. A compression spring 199 serves normally to hold the valve 195 in a left hand end position (Fig. 7). A solenoid S1 is provided which when energized serves to shift the valve 195 into a right hand end position. In the position of the valve 195 (Fig. 7) fluid under pressure in the pressure pipe 58 enters the valve chamber 197 and passes through a pipe 200, through a ball check valve 201 and a throttle valve 202, through the pipe 191 into the cylinder chamber 190 to move the piston 181 into an inoperative position as shown in Figs. 5 and 7. During this movement fluid within the cylinder chamber 190 may exhaust through the pipe 189 into the valve chamber 198, through a central passage 203 in the valve 195 into the valve chamber 196 and exhausts through a pipe 204 into the reservoir 57.

When the solenoid S1 is energized and the valve 195 shifts to a right hand end position, fluid under pressure entering the valve chamber 197 may pass through the pipe 189 into the cylinder chamber 190 to cause the piston 181 together with the loader head 185 to move in a forward direction so as to pick up a valve 107 at the lower end of the work loading chute 170 and convey it into axial alignment with the work collet 106. During this movement fluid exhausts from the cylinder chamber 191 through the pipe 192 and through the throttle valve 202, through the pipe 200, through the valve chamber 196 and exhausts through the pipe 204. By manipulation of the throttle valve 202, the rate of movement of the loader head 185 to an operative position may be regulated as desired.

The loader head 185 is provided with a rod 210 fixedly mounted thereon which is provided with an adjustable dog 211 which is arranged to actuate a limit switch LS4 and an adjustable dog 212 which is arranged to actuate a normally open limit switch LS1. As illustrated in Fig. 7, when the piston 181 moves the work head 185 forward for a loading operation, the dog 211 rides off the actuating roller of the limit switch LS4 and allows the limit switch LS4 to close. When the loader head 185 approaches its forwardmost position, the dog 212 engages the actuating roller of the limit switch LS1 and closes the limit switch LS1.

A pusher mechanism is provided for engaging the head of the valve 107 when the loader head 185 is in a forward position to push the valve into operative engagement with the work supporting collet 106. This mechanism comprises a pusher head having a frusto-conical surface 220 which is arranged to engage the head of the valve 107. The pusher 220 is mounted on the left hand end of a piston rod 221 (Fig. 7), the other end of which is connected to a piston 222 slidably mounted within a cylinder 223. The cylinder 223 is formed integral with a base member 224. The base member 224 is supported on the platen 75 and is arranged to be adjusted relative thereto. The platen 75 is provided with a slideway 225 which engages a correspondingly shaped slideway formed on the underside of the base member 224. The slideway 225 is positioned so that the axis of the pusher head 220 and the cylinder 223 are in axial alignment with the work supporting collet 106. The base member 224 is provided with a projecting threaded stud 226 which passes through a clearance hole in a bracket 227 which is fixedly mounted on the left hand end of the platen 75 (Fig. 4). A pair of adjusting nuts 228 and 228a are carried by the stud 226 and arranged on opposite sides of the bracket 227. By manipulation of the nuts 228 and 228a, the base member 224 may be adjusted longitudinally relative to the platen 75 so as to position the pusher head 220 as desired. The base member 224 is preferably adjusted so that when the piston 222 engages the right hand end of the cylinder 223 (Fig. 4), the pusher head 220 will push the valve 107 to be ground into a predetermined position relative to the operative face of the grinding wheel. An adjustable stop stud 229 is mounted in the left hand end of the cylinder 223 (Fig. 4) by means of which the movement of the piston 222 toward the left may be varied so as to control the inoperative position of the pusher head 220.

When fluid under pressure is passed through a pipe 230 into a cylinder chamber 231, the piston 222 will be moved toward the right (Fig. 4) so that the head 220 engages the head of a valve 107 to be ground and positions it toward the right into engagement with the work supporting collet 106. As above explained this movement of the valve into the collet continues until the piston 222 engages the right hand end of the cylinder 223 thereby positioning the face of the valve 107 to be ground in the desired relationship with the operative face of the grinding wheel 15. During this movement fluid within a cylinder chamber 232 may exhaust through a pipe 233.

A solenoid actuated control valve 235 is provided for controlling the admission to and exhaust of fluid from the cylinder 223. The valve 235 is normally held in a left hand end position (Fig. 7) by means of a compression spring 236. A solenoid S2 is provided which when energized serves to shift the valve 235 toward the right. The valve 235 is a piston type valve comprising a slidably mounted valve member having a plurality of spaced valve pistons forming spaced valve chambers 237, 238, and 239. The slidably mounted valve member is also provided with a central passage 240.

The valve 235 is connected by a pipe 241 with a solenoid actuated control valve 242. The control valve 242 is normally held in a left hand end position by a compression spring 243. A solenoid S3 is provided which when energized serves to shift the valve 242 into a right hand end position. The valve 242 is a piston type valve having a slidably mounted valve member formed with a pair of spaced pistons to form a valve chamber 244.

In the position of the valves 235 and 242 (Fig. 7) fluid under pressure from the pressure pipe 58 enters the valve chamber 238 in the valve 235 and passes through a pipe 241 into the valve chamber 244 and passes through a pipe 245, through a throttle valve 246 and also through a ball check valve 247 into the pipe 233, into the cylinder chamber 232 to move the piston 222 toward the right (Fig. 7) into an inoperative position with the pusher head 220 also in an inoperative position. During this movement of the piston 222 fluid within the cylinder chamber 231 may exhaust through the pipe 230 into the valve chamber 239, through the central passage 240 into the valve chamber 237 and exhausts through a pipe 248 into the reservoir.

When the solenoid S2 is energized and the valve 235 is in a right hand end position (Fig. 7) fluid under pressure entering the valve chamber 238 from the pressure pipe 58 passes through the pipe 230 into the cylinder chamber 231 to cause the piston 222 to move toward the left (Fig. 7) so that the pusher head 220 engages the head of a valve 107 to be ground which is then located in a forward position by a loader head 185 to push the valve stem into operative engagement with the work supporting collet 106. During this movement of the piston, fluid within the cylinder chamber 232 exhausts through the pipe 233 and through the throttle valve 246, through the pipe 245, through the valve chamber 244, through the pipe 241 into the valve chamber 237 and out through the exhaust pipe 248. It will be readily apparent from the foregoing disclosure that by manipulation of the throttle valve 246, the rate of movement of the pusher head 220 may be readily controlled as desired.

The pusher head 220 carries a rod 250 which is provided with a pair of adjustable dogs or collars 251 and 252. The dog 251 is arranged so that when the head 220 moves toward the left (Fig. 7), the dog 251 will engage the actuating roller and close the normally open limit switch LS6. Similarly the dog 252 is arranged so that when the head 220 moves toward the left, it will engage the actuating roller and close the normally open limit switch LS3.

The head 220 is also provided with a second rod 253 which supports a pair of adjustable dogs 254 and 255. The dog 254 is arranged to close the normally open limit switch LS7 only on the return stroke of the pusher head 220 toward the right. When the pusher head 220 moves toward the left (Fig. 7), the dog 254 engages a one way roller on the limit switch LS7 and rides idly thereover after which the roller returns to an operative position so that the dog 254 closes the limit switch LS7 when the pusher head 220 starts its movement toward an inoperative position, that is, toward the right (Fig. 7). The dog 255 is arranged to engage the actuating roller of a normally closed limit switch LS2 when the pusher head 220 starts its movement toward the left (Fig. 7) to open the limit switch LS2.

A main control lever 265 is pivotally mounted on the front of the machine base 10. When the lever 265 is rocked in a counter-clockwise direction, it closes a normally open start switch 266 to start the automatic cycle of the valve grinding machine. If at any time during the grinding cycle, it is desired to stop the cycle, the lever 265 may be rocked in a clockwise direction to open a stop switch 267 thereby interrupting the grinding cycle and returning the parts to their initial positions. A manually operable switch 270 is provided for controlling the stopping and starting of the work driving motor 90. A manually operable switch 271 is provided for controlling the starting and stopping of the grinding wheel driving motor.

The operation of the improved valve grinding machine will be readily apparent from the foregoing disclosure. A plurality of valves 107 to be ground are placed in the work chute 170. The switches 60, 270, and 271 are then closed to start the fluid pump driving motor, to start the work driving motor 90 and to start the grinding wheel driving motor 16 respectively. When it is desired to start the grinding cycle, the control lever 265 is rocked in a counter-clockwise direction to close the cycle start switch 266 so as to energize the relay switches CR1 and CR15. The energizing of the relay CR1 makes a circuit to energize the solenoid S1 to shift the control valve 195 toward the right so that fluid under pressure from the pressure pipe 58 passes through the valve chamber 197, through the pipe 189 to cause a forward movement of the piston 181 and the work loader head 185 so as to move the upper and lower work engaging fingers 186—187 into engagement with a valve to be ground in the lower end of the loader chute 170 and to move it into axial alignment with the work supporting collet 106. As the work loader head 185 approaches its forward position, the dog 212 engages and closes the limit switch LS1 to energize a relay switch CR2 which in turn closes a circuit to energize the solenoid S2 thereby shifting the valve 235 toward the right. In this position of the valve 235, fluid under pressure from the pressure pipe 58 passes through the valve chamber 238, through the pipe 230 into the cylinder chamber 231 to move the piston 222 and the pusher head 220 toward the left (Fig. 7). The pusher head 220 engages the valve 107 to be ground and moves the valve stem into engagement with the work collet 106. Just as the valve stem of the valve 107 enters the work collet 106, the dog 255 opens the limit switch LS2 to break a holding circuit so as to deenergize the relay switch CR1 thereby deenergizing the solenoid S1 so that the valve 195 returns to the position illustrated in Fig. 7. The shifting movement of the valve 195 toward the left admits fluid under pressure from the pipe 58, through the valve chamber 197, through the pipe 200, through the ball check valve 201 and the throttle valve 202, through the pipe 192 into the cylinder chamber 191 to move the piston 181 to its initial position thereby returning the work loader head 185 to the position illustrated in Fig. 5.

Just before the shoulder on the valve stem of the valve 107 to be ground strikes the loader fingers as it is being moved into the collet 106, the dog 252 closes the limit switch LS3 which is connected through the limit switch LS4 (now closed) to energize the solenoid S3 thereby shifting the valve 242 toward the right to stop the movement of the piston 222 toward the left, providing the fingers 186—187 are still in a position so that the shoulder on the valve stem would strike them.

As the piston 181 and the work loader head 185 approach an inoperative position, the dog 211 opens the limit switch LS4 to deenergize the solenoid S3 thereby allowing the valve 242 to return to the position illustrated in Fig. 7 so that the piston 222 proceeds in its movement toward the left to position the stem of the valve 107 to be ground into the work collet 106. This movement continues until the piston 222 engages the left hand end of the cylinder 223 (Fig. 7). As the piston and pusher head 220 approach this position, the dog 251 engages the actuating roller and closes the normally open limit switch LS6 to energize the solenoid S4a which serves to shift the valve 145 toward the left so that fluid under pressure from the pressure pipe 58 passes through the pipe 130 into the cylinder chamber 133 to move the piston 116 toward the right (Figs. 3 and 6) which serves to shift the sleeve 111 toward the right to actuate the collet 106 to clamp the valve 107 therein.

At the same time that fluid under pressure is admitted to the cylinder chamber 133, fluid under pressure passing through the pipe 130 actuates the pressure switch 160 to break the holding circuit to deenergize the relay switch CR2. Deenergizing relay CR2 serves to deenergize the solenoid S2 so that fluid under pressure from the pressure pipe 58 passes through the pipe 58 through the valve chamber 238, through the pipe 241, through the valve chamber 244, through the pipe 245, through the throttle valve 246 and ball check valve 247, through the pipe 233 into the cylinder chamber 232 to move the piston 222 together with the pusher head 220 toward the right into an inoperative position. During the initial movement of the pusher head 220 toward the right, the dog 254 actuates and closes the limit switch LS7 to close a circuit so as to energize an electric timer T1 which in turn closes a circuit to energize the solenoid S6 to shift the feed control valve 43 toward the left so that fluid under pressure is admitted to the cylinder chamber 48 to cause a forward feeding movement of the wheel slide 11 and the grinding wheel 15 to grind the face of the valve 107 to the desired and predetermined extent.

When the timer T1 times out, after a predetermined time interval, the solenoid S6 is deenergized thereby releasing the compression of the spring 44 which returns the feed control valve 43 into the position illustrated in Fig. 7 so that fluid under pressure is passed to the cylinder chamber 47 to cause a rearward movement of the piston 41 together with the wheel slide 11 to withdraw the grinding wheel 15 to an inoperative position.

When the timer T1 times out, it closes a circuit to energize a relay switch CR3 which breaks a holding circuit to deenergize relay switch CR4 so as to deenergize S5 thereby allowing the released compression of the spring 152 to shift the control valve 151 into a left hand end position as illustrated in Fig. 7. The energizing of relay CR3 makes a circuit to energize the solenoid S4b to shift the valve 145 toward the right into the position illustrated in Fig. 7 so that fluid under pressure from the pressure pipe 58 may pass into the valve chamber 147, through the pipe 155, through the valve chamber 154, through the pipe 156, through the throttle valve 157, through the pipe 122 into the cylinder chamber 129 to move the piston 116 toward the left thereby unclamping the collet 106 to release the stem of the valve 107 which has been ground. Fluid under pressure entering the cylinder chamber 129 first moves the piston 116 toward the left and at the same time passes fluid under pressure through a relatively small passage 141 to move the piston 138 together with the ejector rod 135 toward the right to eject the valve 107 which has been ground from the collet 106. The valve 107 drops onto a tray 260 which is fastened to the forward end of the finger 186. The tray 260 guides the valve 107 as it slides under the influence of gravity into a discharge chute 261.

During movement of the piston 138 and the ejector rod 135 toward the right, the ball bearing ring 144 engages the actuating roller of the limit switch LS5 to break the upper contacts thereof so as to break a holding circuit and deenergize the relay switch CR3. Actuation of the limit switch LS5 closes the lower contacts thereof (Fig. 7) to close a circuit thereby energizing relay switch CR4 which in turn energizes the solenoid S5 to shift the control valve 151 toward the right so that the released compression of the spring 140 returns the ejector rod 135 together with the piston 138 toward the left into the positions illustrated in Fig. 7. During this movement of the ejector rod 135 and the piston 138, fluid within the cylinder chamber 142 may exhaust through the cylinder chamber 129, through the valve 151 and out through the exhaust pipe 159. During this latter movement, the ball bearing ring 144 rides off the actuating roller of the limit switch LS5 and the upper contacts thereof are again closed. The closing of the lower contacts of the limit switch LS5 during the ejection of the valve 107 which has been ground serves to make a circuit to again energize the relay switch CR1 to start a new cycle of operation which is identical with that just described. Successive valves will be ground and the machine will continue to function automatically as long as a supply of valves 107 to be ground are fed into the loading chute 170.

If it is desired at any time during the operation of the machine to stop or interrupt the cycle, the control lever 265 may be rocked in a clockwise direction (Fig. 7) to open the stop switch 267 thereby breaking the circuit so that the parts return to the initial positions as illustrated. A manually operable push button switch 273 is provided between the solenoid S2 and the relay switch CR2 to facilitate manually interrupting the actuation of the pusher 220 in case of emergency. A manually operable switch 272 is provided in the circuit between the timer T1 and the solenoid S6 to facilitate withdrawing the wheel slide 11 and the grinding wheel 15 during a grinding operation in case of an emergency. This switch also serves to facilitate rendering the feeding mechanism inoperative in setting up the machine in case it is desired to operate the valve loading mechanism independently.

It will thus be seen that there has been provided by this invention apparatus in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

1. In a grinding machine having a base, a transversely movable slide thereon, a rotatable grinding wheel on said slide, a feeding mechanism to impart a transverse feeding movement to said slide, a longitudinally movable table on said base, a rotatable work spindle on said table having a work supporting collet, a work chute to support a plurality of work pieces to be ground, a transversely movable work loader head on said table, means including a fluid motor operatively connected to move said head transversely to pick up a work piece to be ground from the lower end of said chute and to convey it into axial alignment with said spindle and collet, means including a longitudinally movable pusher arranged in axial alignment with said collet, and an independent fluid motor to move said pusher longitudinally to push a work piece supported by said head into engagement with said collet.

2. In a grinding machine as claimed in claim 1, in combination with the parts and features therein specified of a fixedly mounted work discharge chute to receive work pieces from said collet, an axially movable work ejector within said work spindle, means including a piston and cylinder to move said ejector in one direction to eject a work piece from said collet into said discharge chute, means including a spring to return said ejector to an inoperative position, and means including a limit switch actuated by and in timed relation with said ejector to initiate the next cycle of operation.

3. In a grinding machine as claimed in claim 1, in combination with the parts and features therein specified of a fixedly mounted work discharge chute, an electrically controlled hydraulically operated mechanism for feeding the grinding wheel slide, an electrically controlled hydraulically operated mechanism to move the work loader transversely to convey successive work pieces into axial alignment with the work collet, an electrically controlled hydraulically operated pusher actuating mechanism to push a work piece from said head into operative position in the work collet, an electrically operated hydraulic mechanism to actuate said collet to clamp a work piece to be ground for a grinding operation, and an electrically controlled hydraulically operated mechanism for actuating the work ejector to release said collet and eject a ground work piece from said collet into said discharge chute.

4. In a grinding machine as claimed in claim 1, in combination with the parts and features therein specified of a piston and cylinder operatively connected to move said loader head transversely, a solenoid actuated control valve therefor, an independent piston and cylinder operatively connected to actuate said pusher, a solenoid actuating control valve therefor, and means including a limit switch actuated by and in timed relation with the transverse movement of the work loader to actuate said second solenoid actuated valve to initiate a longitudinal movement of said work pusher.

5. In a grinding machine as claimed in claim 1, in combination with the parts and features therein specified of a fixedly mounted work discharge chute, a piston and cylinder operatively connected to move said loader head transversely, a solenoid actuated control valve therefor, an independent piston and cylinder operatively connected to actuate said pusher, a solenoid actuated control valve therefor, a piston and cylinder operatively connected to actuate said work collet, a solenoid actuated control valve therefor, a piston and cylinder operatively connected to actuate said work ejector rod, a solenoid actuated control valve therefor, and means including a relay switch actuated by and in timed relation with the wheel feeding mechanism to actuate said fourth solenoid actuated control valve to unclamp said collet and to actuate said ejector to eject a ground work piece from said collet into said discharge chute.

6. In a grinding machine having a base, a transversely movable slide thereon, a rotatable grinding wheel on said slide, a feeding mechanism to impart a transverse feeding movement to said slide, a longitudinally movable work table on said base, a rotatable work spindle on said table having a work supporting collet, a work loading chute on said table to support a plurality of work pieces to be ground, a transversely movable work loader head on said table, means to move said head transversely to pick up a work piece to be ground from the lower end of said chute and to convey it into axial alignment with said spindle and collet, independent means including a pusher arranged in axial alignment with said collet to position a work piece supported by said head into engagement with said collet, means to actuate said collet to clamp a work piece therein, and means actuated by and in timed relation with the movement of said pusher to initiate an infeeding movement of the grinding wheel to grind a surface on the work piece to a predetermined extent.

7. In a grinding machine having a base, a transversely movable slide thereon, a rotatable grinding wheel on said slide, a feeding mechanism to impart a transverse feeding movement to said slide, a longitudinally movable work table on said base, a rotatable work spindle on said table having a work supporting collet, means to swivel said spindle relative to said table in a horizontal plane to position the axis of said spindle relative to the axis of the grinding wheel, a work loading chute to support a plurality of work pieces to be ground, a transversely movable work loader head on said table, a pair of spaced work gripping fingers on said head, means to move said head transversely so that said fingers pick up a work piece to be ground from the lower end of said chute and to convey it into axial alignment with said collet, means including a pusher arranged in axial alignment with said collet to position a work piece supported by said fingers into engagement with said collet, means momentarily to stop said pusher while the work piece is supported by said collet and pusher to facilitate withdrawal of said loader head, said pusher actuating means thereafter to push the work piece to be ground into a predetermined position within said collet, means to actuate said collet to clamp a work piece therein, and means actuated by and in timed relation with the movement of said pusher to initiate an infeeding movement of the grinding wheel to grind a surface on the work piece to a predetermined extent.

References Cited in the file of this patent

UNITED STATES PATENTS

| | | |
|---|---|---|
| 1,991,724 | Binns et al. | Feb. 19, 1935 |
| 2,092,895 | Stevens | Sept. 14, 1937 |
| 2,113,387 | Silven | Apr. 5, 1938 |
| 2,517,193 | Fraser | Aug. 1, 1950 |
| 2,518,375 | Richards | Aug. 8, 1950 |
| 2,607,394 | Diezel | Aug. 19, 1952 |
| 2,610,448 | Mader | Sept. 16, 1952 |
| 2,624,985 | Happel | Jan. 13, 1953 |
| 2,678,521 | Flohr | May 18, 1954 |